(12) United States Patent
Gervais et al.

(10) Patent No.: US 9,992,495 B2
(45) Date of Patent: Jun. 5, 2018

(54) METHOD FOR ENCODING A MATRIX, IN PARTICULAR A MATRIX REPRESENTATIVE OF A STILL OR VIDEO IMAGE, USING A WAVELET TRANSFORM, WITH NUMBERS OF WAVELET LEVELS THAT VARY ACCORDING TO THE IMAGE AND DIFFERENT QUANTIZATION FACTORS FOR EACH WAVELET LEVEL

(71) Applicant: Jean-Claude Colin, Paris (FR)

(72) Inventors: Than Merc-Eric Gervais, Paris (FR); Bruno Loubet, Paris (FR); Nicolas Bessou, Sartrouville (FR); Yves Guimiot, Conflans-Sainte-Honorine (FR); Mickael Petitfils, Livry-Gargan (FR); Sebastien Roques, Paris (FR)

(73) Assignee: Jean-Claude Colin, Versailles (FR)

( * ) Notice: Subject to any disclaimer, the term of this patent is extended or adjusted under 35 U.S.C. 154(b) by 246 days.

(21) Appl. No.: 15/027,621

(22) PCT Filed: Sep. 24, 2014

(86) PCT No.: PCT/FR2014/000213
§ 371 (c)(1),
(2) Date: Apr. 6, 2016

(87) PCT Pub. No.: WO2015/052388
PCT Pub. Date: Apr. 16, 2015

(65) Prior Publication Data
US 2016/0255347 A1 Sep. 1, 2016

(30) Foreign Application Priority Data

Oct. 10, 2013 (FR) ...................................... 13 59861

(51) Int. Cl.
H04N 19/124 (2014.01)
H04N 19/172 (2014.01)
(Continued)

(52) U.S. Cl.
CPC ......... *H04N 19/124* (2014.11); *H04N 19/136* (2014.11); *H04N 19/172* (2014.11);
(Continued)

(58) Field of Classification Search
None
See application file for complete search history.

(56) References Cited

PUBLICATIONS

Sakji Sarra et al.: "Indexing of multichannel images in the wavelet transform domain", Information and Communication Technologies: From Theory to Applications, 2008. ICTTA 2008. 3rd Nternational Conference on, IEEE, Piscataway, NJ, USA, Apr. 7, 2008, pp. 1-6, XP031258142 (Year: 2008).*

(Continued)

*Primary Examiner* — Anand S Rao
*Assistant Examiner* — Tyler B Edwards
(74) *Attorney, Agent, or Firm* — Young & Thompson

(57) ABSTRACT

An encoding method for encoding successive layers of an initial matrix into a compressed matrix and restoring it as a restored matrix, each cell of the initial matrix containing a respective initial numerical value; each cell of the compressed matrix containing a respective compressed numerical value corresponding to the respective initial numerical value; each cell of the restored matrix containing a respective restored numerical value corresponding to the respective initial numerical value; is characterized in that to encode, one applies: —wavelet transforms applied to the entire matrix over a limited number of levels, such that a residual level remains with dimensions larger than or equal to 2×2; then, a differential encoding of the residual level, i.e., (Continued)

a compression of the residual level by obtaining differences with each of the values of the residual level.

15 Claims, 2 Drawing Sheets

(51) Int. Cl.
    *H04N 19/136*      (2014.01)
    *H04N 19/187*      (2014.01)
    *H04N 19/635*      (2014.01)
    *H04N 19/63*      (2014.01)

(52) U.S. Cl.
    CPC ........... *H04N 19/187* (2014.11); *H04N 19/63* (2014.11); *H04N 19/635* (2014.11)

(56) References Cited

PUBLICATIONS

David S. Taubman et al.: "JPEG2000: Standard for Interactive Imaging", Proceedings of the IEEE, IEEE. New York, US, vol. 90, No. 8, Aug. 1, 2002, XP011065053.

Jens-Uwe Garbas et al.: "Methods and Tools for Wavelet-Based Scalable Multiview Video Coding", IEEE Transactions on Circuits and Systems for Video Technology, IEEE Service Center, Piscataway, NJ, US, vol. 21, No. 2, Feb. 1, 2011, pp. 113-126, XP011348871.

Amar Aggoun: "Compression of 3D Integral Images Using 3D Wavelet Transform", Journal of Display Technology, IEEE Service Center, New York, NY, US, vol. 7, No. 11, Nov. 1, 2011, pp. 586-592, XP011383430.

Sakji Sarra et al.: "Indexing of multichannel images in the wavelet transform domain", Information and Communication Technologies: From Theory to Applications, 2008. ICTTA 2008. 3rd International Conference on, IEEE, Piscataway, NJ, USA, Apr. 7, 2008, pp. 1-6, XP031258142.

K.C.B. Tan et al.: "An embedded extension algorithm for the lifting based Discrete Wavelet Transform in JPEG2000", 2002 IEEE International Conference on Acoustics, Speech, and Signal Processing. Proceedings. (ICASSP). Orlando, FL, May 13-17, 2002; pp. IV-3513, XP032015597.

Carl J. Debono et al.: "Efficient implementation of the integer lifting transform for video compression on FPGA", Proceedings ELMAR—2013, Croatian Society Electronics in Marine—ELMAR, Sep. 25, 2013, pp. 71-74, XP032524474.

Morteza Gholipour, Hossein Ahmadi Noubari, Mahmoud Kamarei: "A DSP implementation of lifting based DWT for image processing applications", SPIE, PO Box 10 Bellingham WA 98227-0010, USA, vol. 8285, No. 828545-1, Dec. 31, 2011, XP040565157.

Ning Xu et al.: "A wireless sensor network for structural monitoring", Proceedings of the 2nd International Conference on Embedded Networked Sensor Systems, SENSYS '04, Jan. 1, 2004, p. 13, XP055008158.

Mihaela Van Der Schaar, Philip Chou and All: "Multimedia over IP and Wireless Networks", Referex, Mar. 31, 2007, pp. 135-152, XP040425641.

\* cited by examiner

METHOD FOR ENCODING A MATRIX, IN PARTICULAR A MATRIX REPRESENTATIVE OF A STILL OR VIDEO IMAGE, USING A WAVELET TRANSFORM, WITH NUMBERS OF WAVELET LEVELS THAT VARY ACCORDING TO THE IMAGE AND DIFFERENT QUANTIZATION FACTORS FOR EACH WAVELET LEVEL

This invention relates to the field of encoding numeric values arranged in a matrix, in particular if said matrix is a two-dimensional matrix, representing the pixels of an image.

The main constraints of compression methods are, on the one hand, to minimize, by compressing it, the volume, measured in bytes, of an initial digital file and, on the other hand, to restore a file as close as possible to the initial file. Numerous image compression methods used wavelet transforms, in particular that known as Jpeg2000. Each level of wavelets, applied horizontally, divides the width by a factor of two; applied vertically, divides the height by a factor of two; applied two-dimensionally, divides the two dimension of the image by a factor of two. The existing codecs compress images by wavelets until the residual image is only one pixel. To reduce the number of levels of wavelets to be applied, some of these codecs, such as Jpeg2000, divide the image into rectangular sub-portions, called tiles. This technique makes it possible to reduce the number of levels by considering each of the image sub-portions to be a whole image. However, it has the disadvantage of producing artifacts/discontinuities at the tile borders on the restored image after decompression.

The invention is intended to propose a simple compression method that makes it possible, when it is applied to a matrix representing an image, of combining the advantages of the division of said image into tiles, without having the disadvantage of producing, on the restored image, discontinuities associated with the transformation, i.e. the compression then the decompression, of said tiles.

A method according to the invention, for encoding, in successive layers, an initial matrix as a compressed matrix and restoration thereof as a restored matrix, each cell of the initial matrix containing a respective initial numeric value; each cell of the compressed matrix containing a respective compressed numeric value corresponding to the respective initial numeric value; each cell of the restored matrix containing a respective restored numeric value corresponding to the respective initial numeric value; characterized in that, in order to encode, i.e. compress the initial matrix, the following are applied:
  wavelet transformations applied to the entire image over a limited number of levels, so that there is a residual level with dimensions greater than 2×2; then,
  differential encoding of the residual level, i.e. a compression of the residual level by obtaining differences with each of the values of the residual level, in its initial form (before encoding of this level) or its restored form (after decoding of this level).

The method is advantageously applied to the encoding of a matrix in which each of the values corresponds to a pixel of an image.

A plurality of embodiments of the invention will be described below, as non-limiting examples, with reference to the appended drawings, wherein.

Figure 1:
FIG. 1 shows a raw image with a size of 320×224 pixels.
Figure 3:
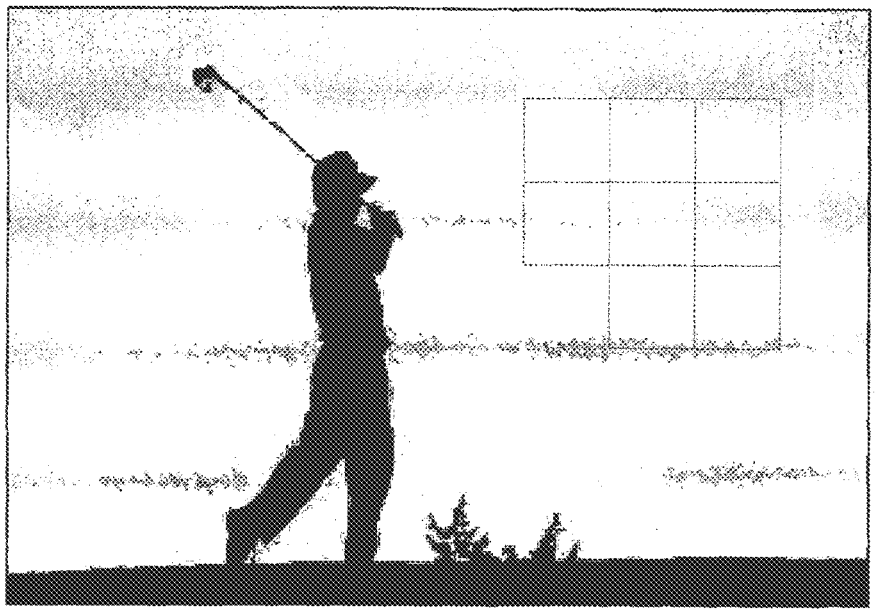
Figure 4:

FIG. 3 shows a second restored image, resulting from the compression then the decompression by means of a wavelet method of the prior art applied to the raw image of FIG. 1, pre-cut into tiles of 32×32 pixels; and FIG. 4 shows a third restored image, resulting from the compression then the decompression by a wavelet method according to the invention globally applied to the entire raw image of FIG. 1.

A method according to the invention will be described in its use for digital compression of an image. In this example, a discrete Cohen-Daubechies-Fauveau (CDF) 5/3 wavelet is applied in two dimensions with a lifting method. The original raw image is shown in FIG. 1. The restored image, after compression then decompression of the initial image by this method, is shown in FIG. 4. In the example shown, the image is an image in gray levels including 320 columns and 224 rows, i.e. 320×224 pixels.

According to the method, a number of levels adapted to the image compression is calculated. By number of levels, we mean the sum of the number of levels processed by wavelets and the residual level processed by differences. For example, an image including four levels will have three levels processed by wavelets and one residual level processed by differences.

In order for the residual level to be sufficiently representative of the content of the image, the number of levels is, for example, calculated as follows:
  the smallest dimension between height and width is taken: for example, in the case of the 320×224 image, the minimum dimension is the height, i.e. min_dim=224;
  the number of levels Nb_levels is determined by applying the following formula to the minimum dimension:

$$Nb\_levels = ARRONDI.INF\ [ln(min\_dim)/ln(2)-3]$$

And, $$1 \leq Nb\_levels \leq 5$$

wherein:
ARRONDI.INF represents the lower rounding. For example:

$$ARRONDI.INF(4.99)=4$$

Ln represents the Napierian logarithm.

Preferably, and in the example shown, for large images, there is a limit of 5 levels. Thus, if:

$$ARRONDI.INF\ [Ln(min\_dim)/ln(2)-3]>5, then$$
$$Nb\_levels=5.$$

For very small images, there is at least one level. Thus, if:

$$ARRONDI.INF\ [ln(min\_dim)/ln(2)-3]=0, then$$
$$Nb\_levels=1.$$

In the example shown:
Ln(224)=5.41
Ln(2)=0.69
Therefore:

$$Nb\_levels=ARRONDI.INF[(5.41/0.69)-3]=4$$

There will therefore be four levels, with three levels processed by wavelets and one residual level processed by differences.

Below, we will consider the first level to be the starting level for decoding of the image, i.e. the level processed by differences, previously called "residual level", i.e. the level having the smallest resolution; the last level is that containing the complete image.

Quantification factors are also calculated. In the example presented, a quantification factor is defined for each level. If said factor is 1, there is no quantification and the transformation is applied without any loss. When a quantification factor is applied to a wavelet level, each of the sub-matrices LH, HL and HH of said level is quantified with said quantification factor. When a quantification factor is applied to the residual level, each of the difference values is quantified according to said factor. Advantageously, the values of the quantification factors are increasing at each level: the last levels, containing more data, will be quantified more than the first.

These transformations and quantification may also be performed with whole numbers as well as with fixed-point decimal numbers, for all or some of the levels.

The method of calculation of the quantification factors may be as follows:
  a maximum quantification factor Qmax is defined, which will be applied to the matrix HH of the last level; and
  said factor is divided by 2 to obtain the quantification factor of the matrices LH and HL of this same last level; then,
  for each of the other wavelet levels, the quantification factor associated with the matrix HH is defined as being that of the matrices LH and HL of the next level, and that of the matrices LH and HL of the current level is defined as being half that of the matrix HH of the current level.

If a calculated factor is less than 1, there is no quantification.

The residual level, processed by differences, may or may not be quantified.

For simplification, a fixed quantification factor is used for each wavelet level, the factors for each level being defined below.

In the description below, the following conventions are used for the values and for the roundings.

For the values, the conventions are as follows: Systematically, we consider matrices Y in which each value is represented by an element named $y_{m,n}$, in which:
  m represents the number of the row where the element is located in matrix Y;
  n represents the number of the column where the element is located in the matrix;
  the rows n and columns m being numbered from 1, the element $y_{1,1}$ being located at the top left of matrix Y. Thus, a matrix Y may be represented as follows:

| y11 | y12 | y13 | y14 | y15 | y16 | y17 | y18 | Y1n |
|-----|-----|-----|-----|-----|-----|-----|-----|-----|
| y21 | y22 | y23 | y24 | y25 | y26 | y27 | y28 | |
| y31 | y32 | y33 | y34 | y35 | y36 | y37 | y38 | |
| y41 | y42 | y43 | y44 | y45 | y46 | y47 | y48 | |
| y51 | y52 | y53 | y54 | y55 | y56 | y57 | y58 | |
| y61 | y62 | y63 | y64 | y65 | y66 | y67 | y68 | |
| y71 | y72 | y73 | y74 | y75 | y76 | y77 | y78 | |
| y81 | y82 | y83 | y84 | y85 | y86 | y87 | y88 | |
| Ym1 | | | | | | | | ymn |

For the roundings, the conventions are: Except for the calculation f the level number, each time a rounding is necessary, it is performed to the nearest whole value; for example, the following roundings are obtained:
  ARRONDI(0.5)=1
  ARRONDI(0.49)=0
  ARRONDI(-0.49)=0
  ARRONDI(-0.5)=-1

A next step of the method consists in encoding the levels provided by means of wavelets. In the example shown, wavelets of type CDF 5/3 are used.

A vertical wavelet step is obtained with the following equations:
  Calculation of the detailed matrix H:

$$h_{m,n}=y_{m,2n}-[y_{2m-1,n}+y_{2m+1,n}]/2$$

for any m between 1 and half the height of Y, for any n on the width of the matrix Y.
  Calculation of the approximation matrix L:

$$l_{m,n}=y_{2m-1,n}+[h_{m-1,n}+h_{m,n}]/4$$

for m less than or equal to half the height of Y, +1 if the height of Y is uneven, for any n on the width of Y.

A horizontal wavelet step is obtained with the following equations:
  Calculation of the detailed matrix:

$$h_{m,n}=y_{m,2n}-[y_{2m,2n-1}+y_{m,2n+1}]/2$$

for any n between 1 and half the width of Y, for any m on the height of Y.
  Calculation of the approximation matrix:

$$l_{m,n}=y_{m,2n-1}+[h_{m,n-1}+h_{m,n}]/4$$

for n less than or equal to half the width of Y, +1 if the width of Y is uneven, for any m on the height of Y.

Classically, a 2-dimensional wavelet is obtained as follows:
  a vertical wavelet is applied to a Y matrix at the input, to generate a matrix L (approximation) and a matrix H (detailed);
  a horizontal wavelet is applied to the matrix L to obtain a matrix LL (approximation) and a matrix LH (detailed);
  a horizontal wavelet is applied to the matrix H to obtain two matrices HL (detailed) and HH (detailed).

The approximation matrix LL then serves as an input matrix for the previous level.

Then, the first level, or residual level, is encoded, i.e. the residual level after having encoded the other levels by means of wavelets. The values of a matrix Y representing the first level, or residual level, are denoted $y_{m,n}$ according to the convention defined above: the original values are called y, the compressed (quantified) values are called $yQ_{m,n}$ and the restored values are called $yR_{m,n}$.

In the example shown, a factor q=2 is used. The encoding of the last level is performed using quantified differences and by adapting the direction:

The first value $y_{1,1}$ is preserved, so that:

$$yQ_{1,1}=yR_{1,1}=y_{1,1};$$

For all of the values $y_{1,n}$ of the first row:

$$yQ_{1,n}=(y_{1,n}-yR_{1,n-1})/q$$

and, $$yR_{1,n}=yR_{1,n-1}+yQ_{1,n}\times q$$

For all of the values $y_{m,1}$ of the first column:

$$yQ_{m,1}=(y_{m,1}-yR_{m-1,1})/q$$

and, $$yR_{m,1}=yR_{m-1,1}+yQ_{m,1}\times q$$

For all of the remaining values, the vertical bars ∥ representing the absolute value of they contain:

The closest horizontal difference among the restored values is calculated:

$$DH_{m,n}=|yR_{m-1,n}-yR_{m-1,n-1}|$$

The closest vertical difference among the restored values is calculated:

$$DV_{m,n}=|yR_{m,n-1}-yR_{m-1,n-1}|$$

A reference value is chosen according to the smallest difference, which is vertical by default:
if DV<=DH: vertical difference $$yQ_{m,n}=(y_{m,n}-yR_{m-1,n-1})/q$$

and $$yR_{m,n}=yR_{m-1,n}+yQ_{m,n}*xq$$

If DH<DV: horizontal difference:

$$yQ_{m,n}=(y_{m,n}-yR_{m,n-1})/q$$

and $$yR_{m,n}=yR_{m,n-1}+yQ_{m,n}*xq$$

If the last level is not quantified (q=1), the previous formulas may be simplified with $yR_{m,n}=y_{m,n}$.

During the decoding of the last level, the direction is calculated identically to the encoding, and the restored values remain the same. Therefore, the following operations are performed to obtain the restored values:
The first value $y_{1,1}$ is preserved, so that:

$$yR_{11}=yQ_{11};$$

For all of the values $y_{1,n}$ of the first row:

$$yR_{1,n}=yR_{1,n}-yR_{1,n-1}+yQ_{1,n}*q$$

For all of the values $y_{m,1}$ of the first column:

$$yR_{m,1}=yR_{m-1,1}+yQ_{m,1}*q$$

For all of the remaining values:
The closest horizontal difference among the restored values is calculated:

$$DH_{m,n}=|yR_{m-1,n}-yR_{m-1,n-1}|$$

The closest vertical difference among the restored values is calculated:

$$DV_{m,n}=|yR_{m,n-1}-yR_{m-1,n-1}|$$

A reference value is chosen according to the smallest difference, which is vertical by default:
If DV<=DH: vertical difference $$yR_{m,n}=yR_{m-1,n}+yQ_{m,n}*q$$

If DH<DV: horizontal difference:

$$yR_{m,n}=yR_{m,n-1}+yQ_{m,n}*q$$

If the last level is not quantified (q=1), the previous formulas may be simplified with $yR_{m,n}=y_{m,n}$.

Then, the levels previously encoded by wavelets are decoded. For the decoding of each wavelet level, the quantified sub-matrices LH, HL and HH are dequantified, then a two-dimensional inverse wavelet is produced suing said dequantified matrices and the matrix LL restored by the decoding of the previous level.

In the example, we consider the compression of a gray-level image using a two-dimensional CDF 5/3 wavelet.

Figure 2:
FIG. 2 shows a first restored image, resulting from the compression, then the decompression by a wavelet method of the prior art applied globally to the entire raw image of FIG. 1.

An 8-bit image (values from 0 to 255) with dimensions of 320×224 will be encoded in three ways (FIG. 1):
according to a first prior art method: encoding by successive wavelet levels on the entire image until the image is 1 pixel, and restoring an image as shown in FIG. 2;
according to a second prior art method: separation into 32×32 tiles, application of 5 wavelet levels, in order to obtain a size of 1 pixel for the final level and restoring an image as shown in FIG. 3;
according to a method of the invention: application of 3 successive levels on the entire image, then encoding of the differences and restoring an image as shown in FIG. 4.

The successive levels will be quantified according to the same factors in each of the cases, in decreasing level order: 50, 25, 15, 2, 2, 1, 1, 1, 1.

Here, we work only on whole numbers, and, for each wavelet transformation level, a single factor is applied to the matrices LH, HL and HH of said level.

According to the prior art:
With a 320×224 image, it is necessary to have 10 successive wavelet levels on the entire image in order to obtain a 1-pixel image.

The resolutions and factors for quantification of the successive levels are:

| Level | Height | Width | Quantification |
|---|---|---|---|
| 1 | 1 | 1 | 1 |
| 2 | 1 | 2 | 1 |
| 3 | 2 | 3 | 1 |
| 4 | 4 | 5 | 1 |
| 5 | 7 | 10 | 1 |
| 6 | 14 | 20 | 2 |
| 7 | 28 | 40 | 3 |
| 8 | 56 | 80 | 25 |
| 9 | 112 | 460 | 30 |
| 10 | 224 | 320 | 60 |

A discrete two-dimensional CDF 4/3 wavelet transform is applied to each level with a lifting method. The matrices LH, HL, HH of each level are quantified by the associated factor and rounded to the higher whole value:
ARRONDI(0.5)=1
ARRONDI(0.49)=0
ARRONDI(−0.49)=0
ARRONDI(−0.5)=−1

Next, the theoretical weight of the image is calculated as follows: a signal containing all of the quantified wavelet coefficients is formed, and the Shannon entropy formula is applied to them.

Finally, the mean error is calculated in the following way: the absolute value of the difference between each original value and each equivalent restored value is obtained, and the average of the values is taken.

The following results are obtained, presented in FIG. 2:
Theoretical weight: 2.0006 kB
Average difference: 0.8335
According to the first prior art:
The image is divided into 32×32-pixel tiles. Therefore, there are 320/32=10 tiles horizontally, and 224/32=7 tiles vertically, or 10*7=70 tiles in all.

Each of said tiles is compressed with 5 successive wavelet levels, until a 1-pixel tile is obtained, and then quantified with the same factors as above. For each tile, the following are obtained:

| Level | Height | Width | Quantification |
|---|---|---|---|
| 1 | 1 | 1 | 1 |
| 2 | 2 | 2 | 2 |
| 3 | 4 | 4 | 3 |
| 4 | 8 | 8 | 25 |

| Level | Height | Width | Quantification |
|---|---|---|---|
| 5 | 16 | 16 | 30 |
| 6 | 32 | 32 | 60 |

A discrete two-dimensional CDF 5/3 wavelet transform is applied to each level with a lifting method. The matrices LH, HL, HH of each level are quantified by the associated factor and rounded to the upper whole value:

ARRONDI(0.5)=1
ARRONDI(0.49)=0
ARRONDI(−0.49)=0
ARRONDI(−0.5)=−1

Next, the theoretical weight of the image is calculated as follows: a signal containing all of the quantified wavelet coefficients is formed, and the Shannon entropy formula is applied to them.

Finally, the average error is calculated as follows: the absolute value of the difference between each original value and each equivalent restored value is obtained, and the average of the values is taken.

The following results are obtained, presented in FIG. 3:
Theoretical weight: 2.1775 kB
Average difference: 1.2197

It is also noted that the borders of the tiles are marked on the restored image. These borders have been partially underlined by a line added to FIG. 3, in order to better illustrate the point.

According to the method of the invention:
The number of levels necessary is calculated: in this case, the smallest dimension is the height, i.e. a value equal to 224.

There must therefore be:

$$nb\_levels = ARRONDI.INF(\ln(224)/\ln(2)-3)$$
$$= ARRONDI.INF((5.41/0.69)-3)$$
$$= ARRONDI.INF(4.8)$$
$$= 4$$

Therefore, 3 levels of wavelets (levels 2, 3, 4) applied to the entire image, and a residual level encoded by differences are obtained.

The dimensions and factors for quantification of the levels are as follows:

| Level | Height | Width | Quantification |
|---|---|---|---|
| 1 | 28 | 40 | 3 |
| 2 | 56 | 80 | 25 |
| 3 | 112 | 160 | 30 |
| 4 | 224 | 320 | 60 |

A discrete two-dimensional CDF 5/3 wavelet transform is applied to each level with a lifting method. The matrices LH, HL, HH of each level are quantified by the associated factor and rounded to the upper whole value:

ARRONDI(0.5)=1
ARRONDI(0.49)=0
ARRONDI(−0.49)=0
ARRONDI(−0.5)=−1

For the last level, the differences as defined above are applied, then the same rounding is used.

Next, the theoretical weight of the image is calculated as follows: a signal containing all of the quantified wavelet coefficients is formed, and the Shannon entropy formula is applied to them.

Finally, the mean error is calculated in the following way: the absolute value of the difference between each original value and each equivalent restored value is obtained, and the average of the values is taken.

The following results are obtained, presented in FIG. 4:
Theoretical weight: 1.9277 kB
Average difference: 0.7815

Of course, the invention is not limited to the examples described above.

Thus, the wavelets may be used in a single dimension, for example only horizontally, or only vertically, instead of being used two-dimensionally, as described above. It is also possible to use wavelets with or without a lifting method.

Also, a different formula may be used to calculate the number of levels and/or the number of maximum levels may be different from 5. The number of levels may also be predefined. For example, the number of levels may be 3 or 4, i.e. the number of levels processed by wavelets may be 2 or 3 instead of 4.

In addition, it is possible to use a single quantification factor for each wavelet level, or, by contrast, to choose a specific quantification factor for each of the sub-matrices LH, HL, HH of each wavelet level. It is also possible to fix factors arbitrarily for each of the levels, or even each of the sub-matrices of each wavelet level.

A method according to the invention is particularly advantageous. In particular:
- it is simple to use, since even by decompressing only the last level, the image can be viewed;
- it produces a reduced number of levels, and therefore requires a reduced number of different buffers for data to be processed;
- it prevents the appearance of artifacts or discontinuities due to the use of tiles; and
- the scalability of the method is obtained by a partial decoding of the encoded image making it possible to decompress an image to the desired resolution merely the basis of the number of first decompressed levels necessary for obtaining said resolution.

The Shannon entropy, used above, defines the "quantity" of information present in a signal, and therefore gives a precise indication of the quantity of bits necessary for encoding said signal by means of binary encoding techniques such as arithmetic encoding or Huffman encoding. The more the values are repetitive and distributed regularly in the single, the lower the entropy of said signal is. The general formula for calculating the Shannon entropy is as follows:

$$H(X) = H_2(X) = -\sum_{i=1}^{n} P_i \log_2 P_i.$$

wherein Pi represents the probability of appearance of each symbol.

In addition, a method according to the invention is not limited to a two-dimensional matrix. Such a method can, for example, be used with a three-dimensional matrix, in particular for 3D printing of a three-dimensional image.

The invention claimed is:
1. Method for compressing a digital image including a step of encoding, in successive layers, an initial matrix as a compressed matrix and restoration thereof as a restored matrix, each cell of the initial matrix containing a respective initial numeric value; each cell of the compressed matrix containing a respective compressed numeric value corresponding to the respective initial numeric value; each cell of the restored matrix containing a respective restored numeric value corresponding to the respective initial numeric value; characterized in that, in order to encode, i.e. compress the initial matrix, the following is applied:

wavelet transformations applied to the entire image over a limited number of levels, so that there is a residual level with dimensions greater than 2×2; then, differential encoding of the residual level, including, for a cell of the residual level having a respective initial value, the calculation of the corresponding respective compressed value on the basis of a difference between said respective initial value and the respective restored value of a cell of the residual level.

2. The method according to claim 1, wherein the number of wavelets is dependent upon the image size.

3. The method according to claim 2, wherein the calculation of the number of wavelet levels includes at least:

one step of determining the smallest dimension min-dim of the matrix;

one step of determining a total number of levels Nb_levels including the number of wavelet levels and the residual level by the formula: Nb_levels= ARRONDI.INF [ln(min_dim)/ln(2)−3], wherein ARRONDI.INF represents the lower rounded function and ln represents the Napierian logarithm;

a step of thresholding of the total number of levels, Nb_levels, to 1 if Nb_levels<1 and to 5 if Nb_levels>5;

a step of subtracting the last level, the number of wavelet levels being equal to the total number of levels minus 1.

4. The method according to claim 1, wherein at least one sub-matrix is quantified by a quantification factor.

5. The method according to claim 4, wherein the quantification factors for each of the sub-matrices are calculated by a method including:

a step of defining a quantification factor Qmax, applied to the matrix HH of the last level;

a step of determining a quantification factor applied to matrices HL and LH of the last level, equal to half the factor Qmax;

for each of the previous levels to the first level:

a step of determining a quantification factor applied to the matrix HH of said level, equal to the quantification factor of the matrices HL and LH of the next level;

a step of determining a quantification factor applied to the matrices HL and LH of said level, equal to half the quantification factor applied to the matrix HH of said level;

wherein, when a quantification factor is less than 1 for a sub-matrix, no quantification is applied.

6. The method according to claim 1, wherein the wavelets are calculated as whole numbers.

7. The method according to claim 1, wherein the wavelets are calculated as fixed-point decimals.

8. The method according to claim 1, wherein the wavelets are of the Cohen-Daubechies-Fauveau 5/3 type.

9. Method according to claim 1, wherein at least one cell of the residual level may be encoded according to a difference, the direction of which is dependent upon previously encoded values or associated restored values.

10. The method for encoding a two-dimensional matrix according to claim 9, wherein at least one cell of the residual level may be encoded according to a horizontal difference or a vertical difference.

11. The method according to claim 10, wherein the choice of the encoding according to a horizontal or vertical difference for a cell of the residual level includes:

a step of calculating the horizontal difference DH between two values of a first pair of previous restored values, said two values of a first pair of previous restored values being respectively obtained from two cells of the same row, at least one of said two cells of the same row being adjacent to said cell in the residual level;

a step of calculating the vertical difference DV between two values of a second pair of previous restored values, said two values of a second pair of previous restored values being respectively obtained from two cells of the same column, at least one of said two cells of the same column being adjacent to said cell in the residual level;

if the vertical difference DV is less than or equal to DH, the choice of an encoding by vertical difference; otherwise, the choice of an encoding by horizontal difference.

12. The method according to claim 2, wherein at least one sub-matrix is quantified by a quantification factor.

13. The method according to claim 3, wherein at least one sub-matrix is quantified by a quantification factor.

14. The method according to claim 12, wherein the quantification factors for each of the sub-matrices are calculated by a method including:

a step of defining a quantification factor Qmax, applied to the matrix HH of the last level;

a step of determining a quantification factor applied to matrices HL and LH of the last level, equal to half the factor Qmax;

for each of the previous levels to the first level:

a step of determining a quantification factor applied to the matrix HH of said level, equal to the quantification factor of the matrices HL and LH of the next level;

a step of determining a quantification factor applied to the matrices HL and LH of said level, equal to half the quantification factor applied to the matrix HH of said level;

wherein, when a quantification factor is less than 1 for a sub-matrix, no quantification is applied.

15. The method according to claim 13, wherein the quantification factors for each of the sub-matrices are calculated by a method including:

a step of defining a quantification factor Qmax, applied to the matrix HH of the last level;

a step of determining a quantification factor applied to matrices HL and LH of the last level, equal to half the factor Qmax;

for each of the previous levels to the first level:

a step of determining a quantification factor applied to the matrix HH of said level, equal to the quantification factor of the matrices HL and LH of the next level;

a step of determining a quantification factor applied to the matrices HL and LH of said level, equal to half the quantification factor applied to the matrix HH of said level;

wherein, when a quantification factor is less than 1 for a sub-matrix, no quantification is applied.

* * * * *